(12) United States Patent
Rauschmaier et al.

(10) Patent No.: US 11,583,795 B2
(45) Date of Patent: Feb. 21, 2023

(54) FASTENING MODULE AND FILTER SYSTEM

(71) Applicant: MANN+HUMMEL GmbH, Ludwigsburg (DE)

(72) Inventors: Juergen Rauschmaier, Neuenstein (DE); Herbert Pietrowski, Pleidelsheim (DE); Bernd Joos, Lorch (DE); Christoph Krautner, Marklkofen (DE); Daniel Ebnet, Marklkofen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 448 days.

(21) Appl. No.: 16/999,386

(22) Filed: Aug. 21, 2020

(65) Prior Publication Data
US 2021/0031131 A1    Feb. 4, 2021

Related U.S. Application Data

(63) Continuation of application No. PCT/EP2019/054371, filed on Feb. 21, 2019.

(30) Foreign Application Priority Data

Feb. 21, 2018 (DE) .......................... 102018001384.8

(51) Int. Cl.
*B01D 46/00* (2022.01)
*B60H 3/06* (2006.01)
*B01D 46/62* (2022.01)

(52) U.S. Cl.
CPC ....... *B01D 46/0005* (2013.01); *B01D 46/001* (2013.01); *B01D 46/62* (2022.01);
(Continued)

(58) Field of Classification Search
CPC .............. B01D 46/0005; B01D 46/001; B01D 2265/024; B01D 2265/028;
(Continued)

(56) References Cited

U.S. PATENT DOCUMENTS 5,302,153 A    4/1994   Winters
6,464,761 B1  10/2002   Bugli
(Continued)

FOREIGN PATENT DOCUMENTS

DE    8625245 U1    11/1986
DE    8713832 U1    12/1987
DE    19850827 A1    5/2000

*Primary Examiner* — Robert Clemente

(57) ABSTRACT

A fastening module for connecting a filter system to an arched connecting surface with openings for a fluid has a connecting housing connectable in fluid communication to the filter system. Rigid individual channel pieces are arranged in the connecting housing and channels extend in the channel pieces. The channels correspond with the openings in the arched connecting surface. The channel pieces have connecting flanges to be connected to the openings in the arched connecting surface. The channel pieces are connected by flexible connecting regions with each other; with the connecting housing; or with each other and with the connecting housing. The fastening module is connected in fluid communication to the inlet region or outlet region of the filter system. A filter module for the filter system has substantially free intake across its cross section and enables an intake manifold-type distribution of a volume flow passing through the filter element.

29 Claims, 11 Drawing Sheets

(52) U.S. Cl.
CPC ..... B60H 3/0641 (2013.01); *B01D 2265/024* (2013.01); *B01D 2265/028* (2013.01); *B01D 2271/022* (2013.01); *B01D 2279/40* (2013.01); *B01D 2279/50* (2013.01); *B60H 2003/065* (2013.01)

(58) Field of Classification Search
CPC ............ B01D 2279/40; B01D 2279/50; B01D 46/62; B60H 3/0641; B60H 2003/065; B60H 3/0608; B60H 3/0616; B60H 1/245; B60H 1/26
See application file for complete search history.

(56) References Cited

U.S. PATENT DOCUMENTS

| | | | |
|---|---|---|---|
| 6,758,741 | B2 | 7/2004 | Aoki et al. |
| 2002/0174847 | A1* | 11/2002 | Baumann ......... F02M 35/10052 123/184.47 |
| 2004/0187453 | A1* | 9/2004 | Kuji .................. B01D 39/1676 55/498 |
| 2010/0240293 | A1 | 9/2010 | Isaman |
| 2012/0273433 | A1* | 11/2012 | Wessels ............... B01D 35/303 210/232 |
| 2017/0014744 | A1* | 1/2017 | Maier ................ B01D 46/0005 |

\* cited by examiner

FASTENING MODULE AND FILTER SYSTEM

CROSS-REFERENCE TO RELATED APPLICATIONS

This application is a continuation application of international application No. PCT/EP2019/054371 having an international filing date of 21 Feb. 2019 and designating the United States, the international application claiming a priority date of 21 Feb. 2018 based on prior filed German patent application No. 10 2018 001 384.8, the entire contents of the aforesaid international application and the aforesaid German patent application being incorporated herein by reference.

BACKGROUND OF THE INVENTION

The invention concerns a fastening module for connecting a filter system to an arched connecting surface with openings for passage of a fluid, in particular of a cabin air filter system of a motor vehicle, as well as a filter system with a fastening module.

EP 0 608 034 B1 discloses a filter arrangement, in particular for a motor vehicle, with a base part with means for fastening to the vehicle and for delimiting at least one receiving chamber. The filter arrangement comprises at least an exchangeable filter part that is arranged in the receiving chamber. The filter part is shape-stable and the receiving chamber is accessible from the inflow side of the base part.

SUMMARY OF THE INVENTION

An object of the invention is to develop a fastening module by means of which a filter system can be sealed-tightly connected in a simple and reliable way to openings in an arched connecting surface.

A further object of the invention is to develop a filter system that can be seal-tightly connected by means of such a fastening module in a simple and reliable way to openings in an arched connecting surface.

A further object of the invention is to develop a filter module for such a filter system that can be seal-tightly connected with such a fastening module in a simple and reliable way to openings in an arched connecting surface.

The aforementioned object is solved according to an aspect of the invention by a fastening module for connecting a filter system to an arched connecting surface with openings for passage of a fluid, comprising at least one connecting housing, which, as intended, is connectable in fluid communication to the filter system, and channels in the connecting housing which correspond with the openings, extend in rigid individual channel pieces, and are connectable with connecting flanges to the openings in the connecting surface, wherein the rigid individual channel pieces are connected by means of connecting regions with each other and/or with the connecting housing.

According to a further aspect of the invention, the further object is solved by a filter system with such a fastening module, comprising a filter housing, at least one filter element which is arranged in the filter housing and which separates a raw side from a clean side, an inlet region and an outlet region for fluid to be filtered, wherein the fastening module is connected in fluid communication to the inlet region or the outlet region.

According to a further aspect of the invention, the further object is solved by a filter module comprising a filter element in a housing part, wherein the filter module enables an intake manifold-type distribution of a volume flow across its cross section with substantially free intake.

Beneficial configurations and advantages of the invention result from the additional claims, the description, and the drawing.

A fastening module for connecting a filter system to an arched connecting surface with openings for passage of a fluid is proposed, comprising at least one connecting housing, which, as intended, is connected in fluid communication to the filter system, and channels in the connecting housing which correspond with the openings, extend in rigid individual channel pieces, and are connectable with connecting flanges to the openings in the connecting surface. The rigid individual channel pieces are connected by flexible connecting regions to each other and/or to the connecting housing.

The component according to the invention concerns a fastening module for a filter system for connecting to an arched connecting surface, in particular for a cabin air filter system in the vehicle. In this context, the focus is most notably on a particulate matter-separating filter system, for example, a suspended particle filter system, in particular an EPA filter system (EPA=Efficient Particulate Air filter) or HEPA filter system (HEPA=High Efficiency Particulate Air filter). The filter system serves preferably for purifying the air blown into the vehicle cabin. The fastening module can advantageously serve for connecting the clean side of the filter system to the vehicle interior.

HEPA filters are preferably depth filters and separate suspended particles from the air. In the standard EN 1822-3 of the year 2009, filter classes E10-E12 (EPA) and H13-H14 (HEPA) as well as U15-U17 (ULPA=ultra-low particulate air filter) are differentiated. For particles with 0.1 μm-0.3 μm in diameter, an EPA filter of the class E10 exhibits a total efficiency of more than 85%, an EPA filter of the class E11 a total efficiency of more than 95%. A HEPA filter of the class H13 exhibits a total efficiency of more than 99.95% for these particles. Preferably, a filter element is used that exhibits at least the filter class E11 according to EN 1822-3 of the year 2009.

The fastening module is separately produced and radially sealed relative to the filter housing. The fastening module comprises fluid guiding channels and is arranged between an arched connecting surface, preferably arched in all directions, and a filter housing. The arched connecting surface is a sheet metal surface, for example. For better adaptation and sealing action relative to the arched connecting surface, the fastening module comprises rigid individual channel pieces that are flexibly connected to each other and is preferably sealed against the arched connecting surface by an axial seal. In embodiments, the fastening module can comprise in this context three and more individual channel pieces. Relative to the air filter housing, the module is preferably sealed by means of radial sealing rings. The deflection of the arched connecting surface amounts to, for example, 0.1% to 15% of the length and/or width of the component, preferably 0.5% to 10% of the length and/or width of the component.

The particular challenge in this context is that, for connecting to the arched connecting surface in the vehicle, a plurality of adjacently positioned clean air-side openings are present in the connecting surface which must be axially sealed at the arched surface. The arched connecting surface can be, for example, a deep drawn sheet metal as part of the vehicle body, for example, a sheet metal carrier below the windshield of a vehicle.

In order to be able to better compensate the tolerances between the arched connecting surface and flanges of the fastening module relative to each other, it is beneficial when the individual sealing surfaces of the connecting flange of the fluid channels of the fastening module are movable relative to the connecting surface. For this reason, the connecting regions between the individual connecting flanges of the channels, which are connected to each other through the connecting housing, are geometrically configured such that they are flexibly bendable and/or twistable.

Conventional connecting flanges of filter systems are rigid and have generally flat sealing surfaces. With the fastening module according to the invention for a filter system, the required tolerances can be more easily observed because each individual connecting flange can be adapted on its own to the arched connecting surface during assembly by being bendable and/or twistable in all spatial directions and, once connected to the arched connecting surface, remains in this shape.

An important advantage of the fastening module according to the invention for a filter system is therefore the observance of the required manufacturing tolerances. In case of a conventional flange concept, the interaction of the individual connecting flanges of the different channels with each other and with the connecting housing and in combination with the non-flat connecting surface of the vehicle would pose extremely high requirements in regard to the shape precision of the connecting flanges. Since the individual connecting flanges can adapt, independent of each other, to the arched connecting surface of the vehicle, the requirements, for example, in regard to distortion of the connecting flanges or of the connecting housing, are significantly reduced.

The flexibility of the connecting housing of the fastening module is present before the fastening module is completely mounted in the vehicle. The flexibility serves to facilitate or enable a correct assembly process. After the fastening module has been completely mounted, a stable connection with the arched connecting surface exists so that the connecting housing is no longer flexible but as a whole is rigid so that corresponding forces in operation can be absorbed.

A further advantage of the solution according to the invention is that the flexibility of the fastening module can be present at one or a plurality of locations that are independent of each other.

Also, the flexibility of the fastening module can be realized in only one bending direction and/or in a plurality of or in different bending directions. This can be realized respectively at one location of the fastening module or distributed to a plurality of locations.

Advantageously, the fastening module according to the invention can thus comprise defined bending zones, namely substantially at the connecting locations between the channels and the connecting housing of the fastening module. The bending zones are bendable and/or twistable because the connecting housing does not comprise any reinforcement elements or ribs at the locations. The bending zones can be obtained, for example, by targeted wall thickness reduction of the connecting housing at the desired locations.

The fastening module can be advantageously made of plastic material and can be produced in an injection molding process.

Advantageously, the bending direction can be positioned in a plane through the connecting line of the connecting flanges. Such a bending direction provides substantially flexibility in the connecting axis of the connecting flanges which can be advantageous when the filter system expands across the entire width of the vehicle and, correspondingly, must be connected across a large width because the channels are distributed about the entire width.

According to an advantageous embodiment of the fastening module, an axial sealing action relative to the connecting surface can be provided and/or a radial sealing action to the filter housing can be provided. The sealing action can advantageously be realized by means of one or a plurality of lip seals. In case of a lip seal, the sealing effect is provided without force or at least low force by deformation of the sealing lip and not by compression of the seal.

Optionally, the sealing action can be realized by means of one or a plurality of round cord ring seals.

According to an advantageous embodiment of the fastening module, the connecting regions can be configured to be bendable and/or twistable in directions that are inclined relative to each other, in particular in two directions that are perpendicular to each other. In case of an arched connecting surface that is curved strongly in a plurality of directions that are inclined relative to each other, where thus a three-dimensional curvature across a large surface area is present, the fastening module according to the invention can be employed advantageously. Beneficially, a three-dimensional flexibility of the connecting flanges of the channels can be achieved by a corresponding configuration of the connecting regions between the channels and the connecting housing.

According to an advantageous embodiment of the fastening module, a connecting flange can comprise a circumferentially extending seal. Each connecting flange can comprise expediently a circumferentially extending elastomer seal and, in this way, can be connected individually to the corresponding opening in the arched connecting surface and sealed. In this way, a very reliable sealing action of the channels relative to the connecting surface can be achieved, which can seal permanently even under greater operating loads.

According to an advantageous embodiment of the fastening module, the seal can be embodied as an axial lip seal. In the prior art, such a seal has been found to be reliable and permanent in conventional rigid connecting flanges. Advantageously, this type of seal can also be used for the fastening module according to the invention.

According to an advantageous embodiment of the fastening module, a plurality of connecting flanges can comprise a common circumferentially extending seal. Beneficially, also a plurality of connecting flanges, combined to individual groups, can be surrounded by a common circumferentially extending seal. In this way, the sealing action can be designed inexpensively and a beneficial sealing action can still be achieved even for a flexible fastening module. In this context, connecting flanges are expediently combined which are located on a surface part that has a similar curvature.

According to an advantageous embodiment of the fastening module, the connecting housing can be arranged at a clean side of the filter system. Usually, the connection of the clean side of the filter system to the vehicle interior represents the critical part of the air guide. Insofar, the fastening module according to the invention can be used expediently for connection of the air guide of the filtered air to the vehicle interior.

According to an advantageous embodiment of the fastening module, the connecting regions can be designed as a hinge. Alternatively, the flexible connecting regions of the channels can be achieved, instead of by a wall thickness reduction, also by hinges, for example, in the form of film hinges. In this way, the individual connecting flanges of the channels of the fastening module can be adapted in a beneficial way to an arched connecting surface of the vehicle and adjoin seal-tightly.

According to an advantageous embodiment of the fastening module, the connecting housing and/or channels and/or connecting regions can be embodied of plastic material, in particular as an injection molded part. Plastic materials represent inexpensively employable materials for air filter systems. Also, they can be produced very flexibly with regard to the shape configuration by injection molding processes. Different materials, for example, polyamide (PA), polypropylene (PP), can be used as plastic materials in an unreinforced but also in a glass fiber-reinforced form.

According to a further aspect, the invention concerns a filter system with a fastening module for connection to an arched connecting surface.

The filter system comprises a filter housing, at least one filter element which is arranged in the filter housing and which separates a raw side from a clean side, and an inlet region for fluid to be filtered and an outlet region for filtered fluid. In this context, the fastening module is connected in fluid communication to the inlet region or to the outlet region.

The fastening module comprises at least one connecting housing, which, as intended, is connected in fluid communication to the filter system, and one or a plurality of channels in the connecting housing which correspond with the openings and which are connectable with connecting flanges to the openings in the connecting surface. The one or plurality of channels are connected by flexible connecting regions with each other and/or with the connecting housing. In this context, the connecting regions are embodied flexibly bendable and/or embodied twistably in at least one bending direction relative to the one or the plurality of channels.

The filter system according to the invention concerns a filter system for connection to an arched connecting surface, in particular for a cabin air filter system in the vehicle. In this context, the focus is most notably on a filter system for very fine separation, for example, a suspended particle filter system of the kind of an EPA filter system or HEPA filter system. The filter system serves preferably for purifying the air introduced into the vehicle cabin. The fastening module can advantageously serve for connecting the clean side of the filter system to the vehicle cabin.

A significant advantage of the fastening module according to the invention for a filter system is the observance of the required manufacturing tolerances. In case of a conventional flange concept, the interaction of the individual connecting flanges of the different channels of the fastening module with each other and with the connecting housing and in combination with the non-flat connecting surface of the vehicle would pose extremely high requirements in regard to the shape precision of the connecting flanges. Since the individual connecting flanges can adapt, independent of each other, to the arched connecting surface of the vehicle, the tolerance requirements, for example, in regard to the distortion of the connecting flanges or of the connecting housing, are significantly reduced.

According to an advantageous embodiment, the fastening module can be arranged at a clean side of the filter system.

According to a further advantageous embodiment, an axial sealing action relative to the connecting surface and/or a radial sealing action relative to the filter housing can be provided.

According to a further advantageous embodiment of the filter system, at least one filter module with at least one housing part of the filter housing with at least one filter element in the housing part can be provided, wherein the filter module enables an intake manifold-type distribution of the volume flow across its cross section with substantially free intake. Advantageously, the substantially free intake can be realized across the cross section of the filter element while at its outflow side the intake manifold-type distribution of the volume flow is enabled in that the housing part comprises at the outflow side of the filter element at least two outlet channels which are connected in fluid communication with the channels extending in individual channel pieces of the fastening module.

Advantageously, the fluid guide at the outflow side can be matched to a fluid guide of the fastening module. In particular, the outlet channels of the housing part can be matched in their arrangement to the individual channel pieces.

Advantageously, the first filter element can be embodied with the first housing part as a filter module in which the filter element is fixedly mounted in the housing part, for example, glued in. Beneficially, the filter module can be designed to be exchangeable.

According to a further advantageous embodiment of the filter system, the first filter element can be arranged in flow direction downstream of a second filter element wherein the two filter elements each can be arranged in separate housing parts of the filter housing, respectively. The first filter element can be a particle filter, in particular a suspended particle filter element, while the second filter element can be embodied as a prefilter, for example, for absorption of gases. Advantageously, the second filter element can comprise a large cross-sectional surface for the fluid intake. Preferably, the cross-sectional surface is matched to the inflow side cross section of the first filter element.

Beneficially, the filter elements can form with their housing parts a filter module that at least partially is embodied to be exchangeable. Advantageously, the first filter element can be a lifetime part that must not be, or only rarely, exchanged while the second filter element can be exchanged regularly in intervals. In this context, it is beneficial when the second filter element can be exchanged without exchanging the second housing part. Optionally, the entire filter module can also be exchangeable.

According to a further advantageous embodiment of the filter system, the first housing part can be attached to the second housing part. This enables a simple assembly as well as stable connection of the housing parts. Advantageously, a hinge-type connection between the housing parts can be provided which enables an axial pressing of the second filter element. In this way, a reliable sealing action of the prefilter can be achieved.

According to a further advantageous embodiment of the filter system, the first housing part and the second housing part can be detachably connected to each other. This facilitates the exchange of filter elements, in particular of the second filter element.

According to a further aspect of the invention, a filter module for a filter system is proposed wherein the filter module comprises at least one housing part with a filter element in the housing part, wherein the filter module enables an intake manifold-type distribution of a volume flow, passing through the filter element, substantially with free intake across its cross section.

Advantageously, a large intake cross section is available while at the outflow side the fluid can be divided into different partial flows. The filter element can have a simple geometry. The intake manifold-type distribution of the volume flow can advantageously be effected by outlet channels in the housing part. The outlet channels can be designed and arranged in accordance with predetermined connecting geometries.

According to a beneficial embodiment of the filter module, the filter module can be embodied with substantially free intake across its cross section and comprise at least two outlet channels in its housing part for intake manifold-type distribution of the volume flow passing through the filter element. Beneficially, the entire inflow-side cross section of the filter element can be utilized for intake. In a simple geometric shape, the filter element can be embodied with a parallelepipedal shape. Expediently, the filter element comprises a filter bellows whose outer edges are sealed by a circumferentially extending strip.

Advantageously, the at least two outlet channels, as intended, can be connected in flow communication to channels extending in corresponding individual channel pieces of the fastening module.

According to a beneficial embodiment of the filter module, the housing part can be embodied tub-shaped so that at the outflow side of the filter element arranged therein a clean-side air collecting chamber can be formed. Advantageously, the filter element in the first housing part can close off the housing part relative to the inflow side. The tub-shaped structure of the housing part enables a large surface area intake of fluid through the filter element.

According to a beneficial embodiment of the filter module, the housing part can comprise at the outflow side at least two outlet channels that can be connected in fluid communication to the air collecting chamber. Advantageously, an arrangement of the outlet channels can be matched to a clean-side connecting region of the filter module. The filter element can have a simple geometry.

According to a beneficial embodiment of the filter module, the housing part can comprise at the outflow side at least three outlet channels which can be connected in fluid communication to the air collecting chamber. Advantageously, an arrangement of the outlet channels can be matched to the clean-side connecting region of the filter module. The filter element can have a simple geometry.

According to a beneficial configuration of the filter module, the outlet channels can be arranged linearly adjacent to each other along an axis.

According to a beneficial embodiment of the filter module, the filter element can be sealed circumferentially relative to the clean-side air collecting chamber in the housing part. This enables a reliable sealing action of the filter module.

According to a beneficial embodiment of the filter module, the housing part can comprise an inwardly projecting sealing flange region with a sealing surface for seal-tight connection of a further housing part with filter element. The arrangement is compact and enables a reliable sealing action.

According to a beneficial embodiment of the filter module, the filter element can be embodied as a suspended particle filter element, in particular as an EPA filter element or HEPA filter element. Preferably, the filter element has at least class E11 according to EN 1822-3 of the year 2009.

According to a beneficial embodiment of the filter module, at least two housing parts can be provided wherein a further housing part with a further filter element adjoins the first housing part.

Expediently, the inflow-side cross section of the further filter element can be matched to the inflow-side cross section of the first filter element. The filter module can therefore guide the fluid, for example, air, with substantially free intake through the housing parts.

Beneficially, a filter module can be developed with a main filter and a prefilter. Preferably, the further housing part enables at its inflow side an inflow at the further filter element with a surface area as large as possible. The further filter element can be, for example, an absorption filter.

According to a beneficial embodiment of the filter module, the housing parts can comprise one or a plurality of corresponding guides and/or guide elements for attachment of the further housing part.

In this way, the further housing part can be mounted and demounted in a simple way. Advantageously, it can be ensured by means of the guides that the second housing part with inserted second filter element is mounted at an axial protrusion on the first housing part and can be axially pressed against a sealing surface of the first housing part. The axial pressing enables a stable sealing action of the interface between the first and the second housing part.

Optionally, a securing device can be provided, for example, one or a plurality of screws, with which the further housing part can be connected to the first housing part. Even at strong load, for example, by vibrations, temperature change, and the like, a reliable stable connection between the housing parts can be achieved. Also, a distortion of the housing parts, which can be preferably made of plastic material, can be compensated by the securing device.

According to a beneficial embodiment of the filter module, between the first and the second housing part a hinge-like connection can be formed. The hinge-like connection enables an axial pressing of the sealing element in the second housing part between both housing parts.

Beneficially, a filter module with a main filter, in particular suspended particle filter, and a prefilter can be developed wherein a simple and safe assembly as well as a simple exchange of main filter and prefilter is possible. Preferably, the further housing part enables at its inflow side an inflow at the further filter element with a surface area as large as possible. The further filter element can be, for example, an absorption filter.

BRIEF DESCRIPTION OF THE DRAWINGS

Further advantages result from the following drawing description. In the drawings, embodiments of the invention are illustrated. The drawings, the description, and the claims contain numerous features in combination. A person of skill in the art will consider the features expediently also individually and combine them to expedient further combinations.

DESCRIPTION OF PREFERRED EMBODIMENTS

Figure 1:
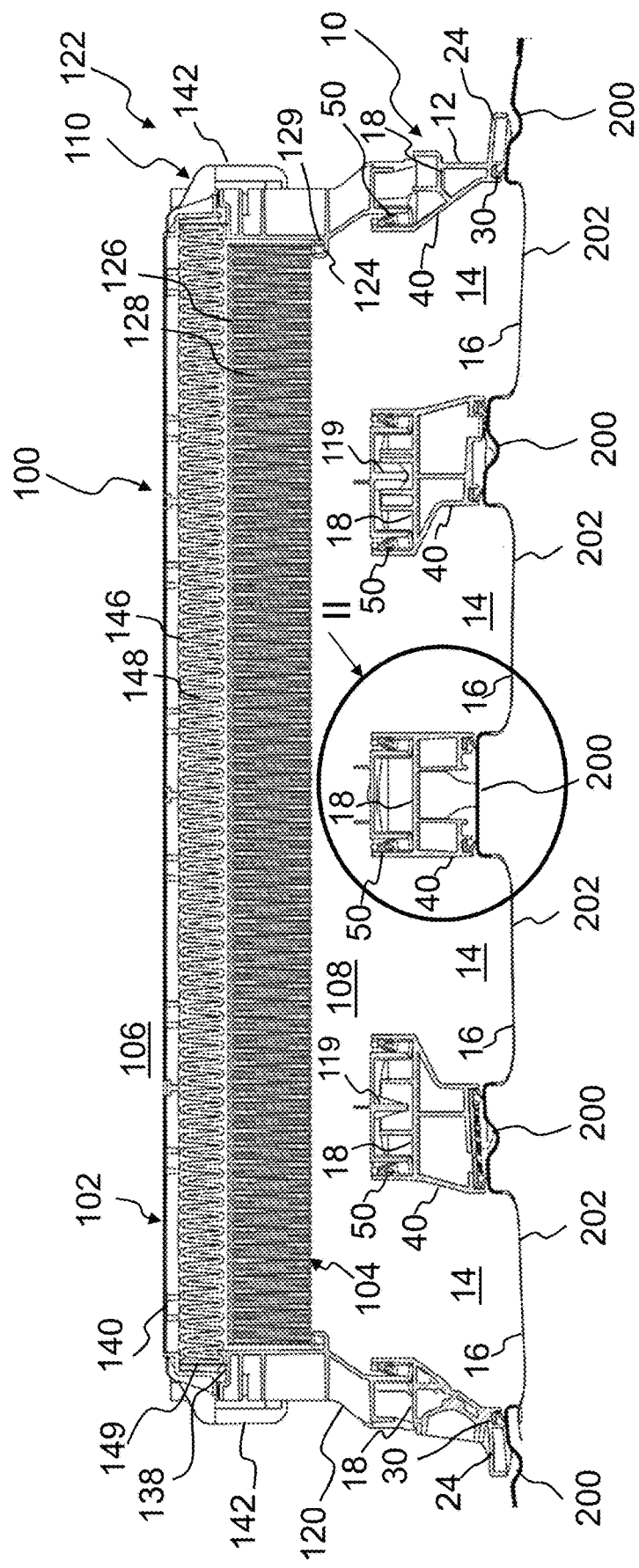
FIG. 1 shows a longitudinal section of a filter system with a fastening module according to an embodiment of the invention which is connected to an arched connecting surface.

In the Figures, the same or same type components are identified with the same reference characters. The Figures show only examples and are not to be understood as limiting.

FIG. 1 shows a longitudinal section of the filter system 100 with a fastening module 10 according to an embodiment of the invention which is connected to an arched connecting surface 200. The filter system 100 is a filter system 100, in particular for a cabin air filter system in the vehicle. The arched connecting surface 200 can represent, for example, a deep drawn sheet metal of a part of the vehicle body. The arched connecting surface 200 comprises openings 202 for passage of the fluid. The fastening module 10 serves as a separate intermediate flange for connecting the filter system 100 to the arched connecting surface 200 with the openings 202 for passage of the fluid.

The filter system 100 comprises a filter module 122 with a filter housing 110 in which at least a first filter element 126 is arranged in a first housing part 120. The illustrated filter module 122 comprises in this embodiment the first housing part 120 as well as a second housing part 140 in which a second filter element 146 is arranged. The second filter element 146 serves as a prefilter for the first filter element 126. Preferably, at least the second filter element 146 can be exchangeable.

The filter module 122 separates a raw side 106 from a clean side 108 of the filter system 100. Preferably, the first filter element 126, which forms the main filter, is embodied as a suspended particle filter element, for example, as EPA or HEPA filter element.

The second filter element 146 closer to the raw side 106 can be, for example, an adsorption filter element for adsorption of gases while the other filter element 126 can serve for separating particles.

The first housing part 120 forms a base body which is covered by the second housing part 140 which is formed preferably at its inlet region 102 as a grid part. This enables a fluid intake practically across the entire inflow side surface of the filter module 122. Advantageously, the filter bellows 128, 148 of the first as well as of the second filter element 126, 146 are thus matched to each other, in particular the second filter element 146 can comprise a cross-sectional surface which is of the same size or larger than the cross-sectional surface of the first filter element 126. Due to the grid part (second housing part 140), the raw-side fluid can reach the filter elements 126, 146 while coarse foreign matter, for example, leaves and such, are kept away from the filter element 146 by the grid part.

Preferably, the first filter element 126 is fixedly arranged in the first housing part 120. Advantageously, the first filter element 126 can be glued to the first housing part 120, for example. The filter bellows 128 of the first filter element 126 is sealed at its edges by a circumferentially extending strip 129 that protrudes at one side of the filter bellows 128, for example, at the outflow side, and is glued into a corresponding circumferentially extending groove 124 of the first housing part 120.

The second filter element 146 is preferably arranged in the second housing part 140. The second filter element 146 can be placed loosely into the second housing part 140.

Both housing parts 120, 140 can be connected to each other non-detachably or preferably detachably. For example, the second housing part 140 can be attached to the first housing part 120 and guided with guiding elements 142 into its end position, as explained in more detail in FIGS. 8-11.

In case of a detachable connection, the housing parts 120, 140 can be clipped together, screw-connected or connected in other ways to each other. In case of a non-detachable connection, the housing parts 120, 140 can be glued or welded to each other.

Optionally, it can be provided to exchange the housing parts 120, 140 with the respective filter element 126, 146 individually when the filter bellows 128, 148 of the respective filter element 126, 124 is maximally loaded. Alternatively, it can be provided to exchange the filter module 122 with both housing parts 120, 140 together with filter elements 126, 146 as a whole.

The filter system 100 comprises the inlet region 102 in the second housing part 140 for the fluid to be filtered, for example, air, and an outlet region 104 for the filtered fluid below the first filter element 126. The fastening module 10 is connected in fluid communication to the outlet region 104 of the filter system 100 and is thus arranged at the clean side 108 of the filter system 100.

For this purpose, the first housing part 120 of the filter module 122 is sealed against the fastening module 10, in particular against rigid individual channel pieces 40 of the fastening module 10 in which channels 14 extend that guide the filtered fluid to the openings 202 of the connecting surface 200.

When used as an air filter, the filtered air is guided through the fastening module 10 and the arched connecting surface 200 into the cabin of the vehicle.

The fastening module 10 comprises a connecting housing 12 which is connected in fluid communication to the filter system 100, preferably with radial sealing action, and a plurality of channels 14 in the connecting housing 12 which correspond with the openings 202, extend in rigid individual channel pieces 40, and are connectable with connecting flanges 16 to the openings 202 in the connecting surface 200. A sealing action relative to the arched surface is realized preferably with one or a plurality of axial seals 30.

Outlet channels 170 (FIGS. 3, 8, 9) of the first housing part 120 correspond with the individual channel pieces 40 of the fastening module 10 such that an intake manifold-type distribution of the volume flow, passing through the filter module 122 and its filter elements 126, 146, can be realized from the filter element 126 at the outflow side at the outlet region 104 while filter module 122 at its inlet region 102 can provide intake across its entire cross section substantially across the entire surface.

The outlet channels 170 (FIGS. 3, 8, 9) of the first housing part 120 of the filter module 122 are sealed with sealing elements 50 preferably radially against the individual channel pieces 40 wherein the individual channel pieces 40 dip into the corresponding outlet channels 170 (FIGS. 3, 8, 9) and a respective sealing element 50 surrounds a respective individual channel piece 40.

The rigid individual channel pieces 40 are connected by flexible connecting regions 18 with each other and with the connecting housing 12. In this context, the connecting regions 18 are embodied to be flexibly bendable and/or twistable in at least one bending direction L (FIG. 4) to the individual channel pieces 40. Preferably, the fastening module 10 is already embodied arched in the region of its connecting flanges 16 to match the arched surface.

Figure 2:
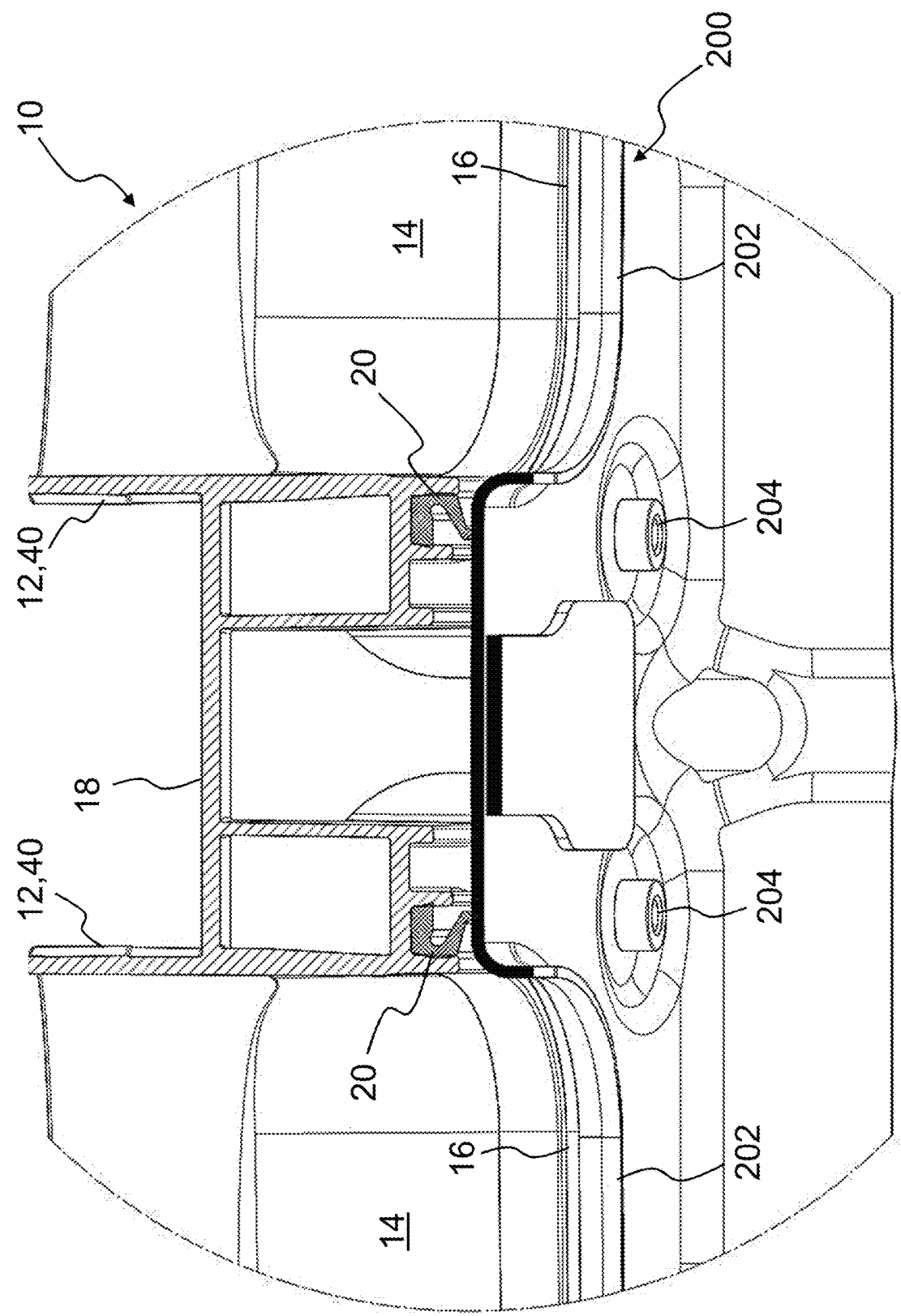
FIG. 2 shows an enlarged detail of the filter system in FIG. 1, viewed at a slant from the contact side at the arched surface, with focus on a connecting region of the fastening module.

A detail of the region of the filter system 100 in the illustrated circle is illustrated enlarged in FIG. 2 with focus on a connecting region 18 of the fastening module 10 in viewing direction from the connecting surface.

The filter system 100 is fastened with its filter housing 110 by fastening sleeves and other fastening elements, in particular screw-connected.

At the bottom side of the arched connecting surface 200, which is facing away from the filter system 100, fastening points 204 can be seen which, for example, serve for screw-connecting the fastening module 10 and thus the filter system 100 to the arched connecting surface 200.

The connecting housing 12 as well as the channels 14 extending in rigid individual channel pieces 40 and the flexible connecting regions 18 of the fastening module 10 can be embodied expediently of plastic material, in particular as injection molded part. Usually, the filter housing 110 is realized with at least two housing parts 120, 140 which can be opened so that the filter elements 126, 146 can be exchanged, as needed. Preferably, the first filter element 126 is exchanged with its housing part 120 while the second filter element 146 can be exchanged separate from its housing part 140.

Optionally, the filter housing 110 can also be embodied as one piece.

In the illustrated longitudinal section, two neighboring channels 14 of the fastening module 10 extending in rigid individual channel pieces 40 are sectioned and partially recognizable. The individual channel pieces 40 with the channels 14 have connecting flanges 16, respectively, which are connected axially sealed with a sealing segment 20 to the openings 202 of the arched connecting surface 200. Between the channels 14, the connecting region 18 can be seen which is embodied according to the invention in a bendable and/or twistable way in order to enable an adaptation of the channels 14 to an angle position of the openings 202 such that the channels 14 can be connected to the openings 202 sufficiently fluid-tightly for the given requirements.

Figure 3:
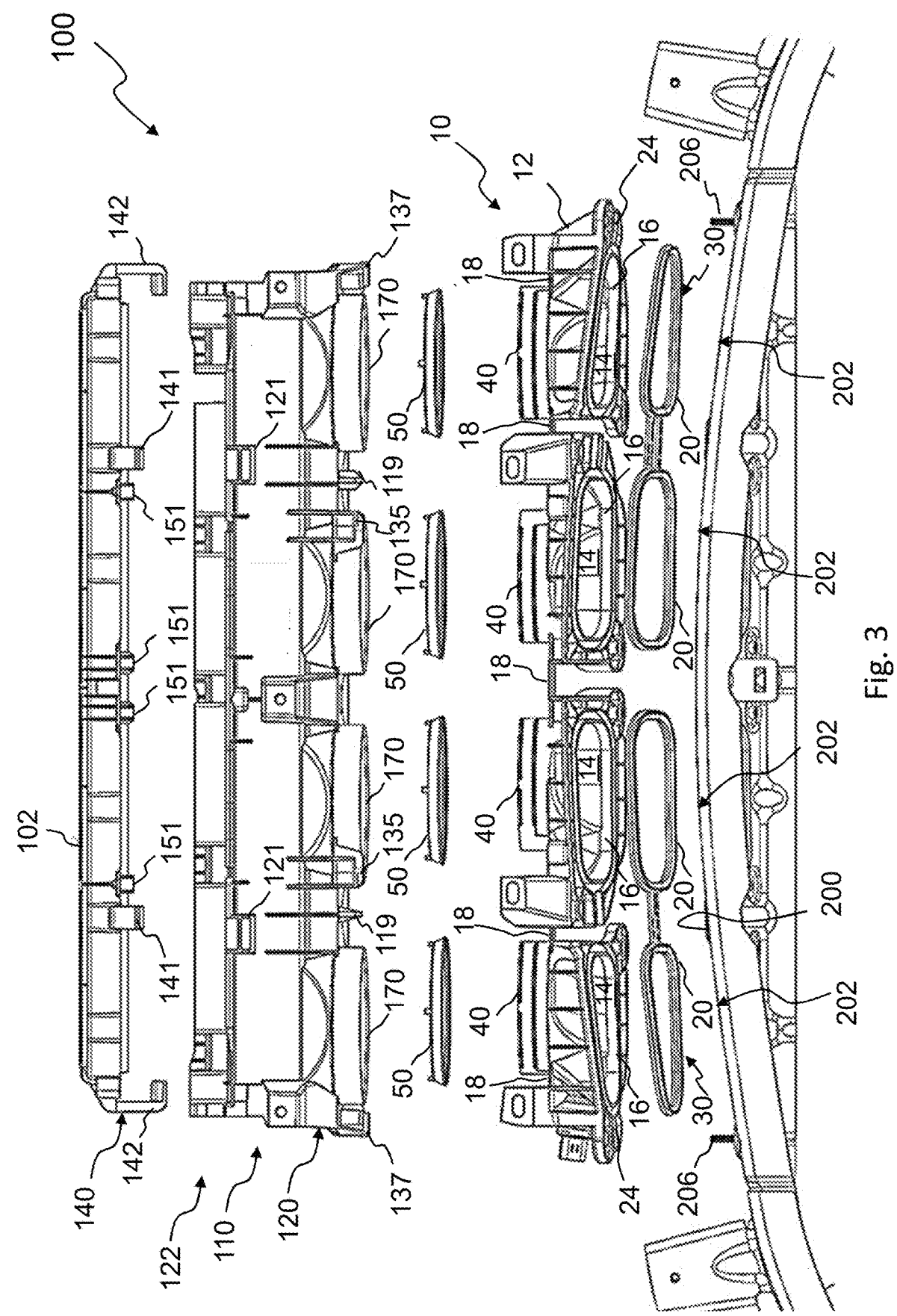
FIG. 3 is an exploded illustration of the filter system of FIG. 1.

FIG. 3 shows an exploded illustration of the filter system 100 in FIG. 1. The filter housing 110 is of a two-part configuration with the second housing part 140 and the first housing part 120. At the outlet side of the filter housing 110, outlet channels 170 are formed which each form, together with corresponding individual channel pieces 40 of the fastening module 10, a plug-in connection, wherein sealing elements 50 for a preferably radial sealing action are provided between the outlet channels 170 and the individual channel pieces 40. Expediently, the sealing elements 50 can be designed as lip seals in which the sealing effect is realized without force or at least with low force by deformation of the sealing lip and not by compression of the seal. An intake manifold-type distribution of the volume flow, flowing through the filter module 122 with the filter elements 126, 146, is realized by the outlet channels 170, as described above.

The fastening module 10 comprises at its bottom side connecting flanges 16 which by means of axial sealing action are sealed at the arched connecting surface 200. For easier assembly, two circumferentially closed sealing segments 20 are combined in a seal 30, respectively, and are connected by a connecting piece in the illustrated embodiment. The sealing segments 20 can be lip seals, respectively, or optionally round cord rings or other seals such as, for example, X-ring seals. The fastening module 10 is aligned and fastened with its centering receptacles 24 at the centering pins 206 as well as screw-connected at fastening points to the arched connecting surface 200. The centering pins 206 can have a thread so that the filter module 122 with its filter housing 110 can be screw-connected thereto. For this purpose, the first housing part 120 of the filter module 122 has at its bottom side, at both ends a fastening sleeve 137, respectively, which is positioned above the lateral centering receptacles 24 and into which the centering pins 206 project.

Moreover, pins 119 are provided at the bottom side of the first housing part 120 that help to center the first housing part 120 at the fastening module 10.

In the illustrated embodiment, the channels 14 of the fastening module 10 end at the arched connecting surface 200. Optionally, it can be provided that the channels 14 project into the openings 202 of the arched connecting surface 200. This allows for connecting separate fluid conduits to the channels 14, for example. In this way, a separate sealing action of the fastening module 10 against the arched connecting surface 200 can be omitted.

Figure 4:
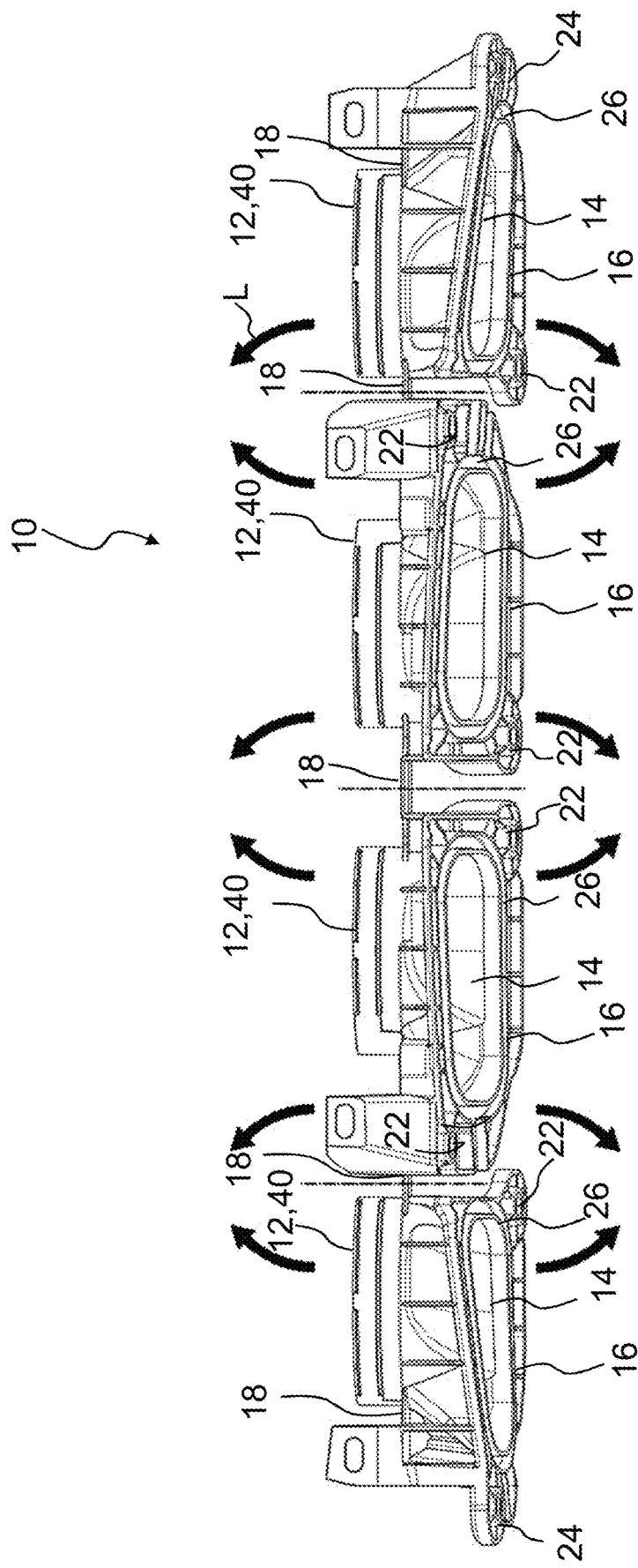
FIG. 4 shows the fastening module of the filter system of FIG. 1 in isometric view.

FIG. 4 shows the fastening module 10 of FIG. 1 in isometric view. In this context, possible bending directions L of the connecting regions 18 are illustrated by curved arrows. Bending is possible in all spatial directions. In this way, the connecting flanges 16 of the channels 14 of the fastening module 10 which extend in the individual channel pieces 40 can be adapted substantially in this one bending direction L to the openings 202 of the arched connecting surface 200. Alternatively, the connecting regions 18 can however also be embodied to be bendable and/or twistable in directions which are inclined relative to each other, in particular in two directions that are perpendicular to each other. In this way, the connecting flanges 16 of the channels 14 of the fastening module 10 can be adapted much more flexibly to the openings 202 of the arched connecting surface 200.

Each connecting flange 16 is provided with a sealing surface, for example, a sealing groove 26 into which a sealing ring can be inserted.

Centering receptacles 24 can be seen at the rim of the fastening module 10, by means of which the fastening module 10, by receiving corresponding centering pins 206 (see FIG. 5), can be centered at the connecting surface 200 upon connection to the arched connecting surface 200. The centering pins 206 can have a thread.

At the interface surface of the fastening module 10 facing the arched connecting surface 200, further fastening sleeves 22 can be seen which serve for screw-connecting the fastening module 10 to the arched connecting surface 200. For example, at each connecting flange 16 two fastening sleeves 22 can be provided.

Figure 5:
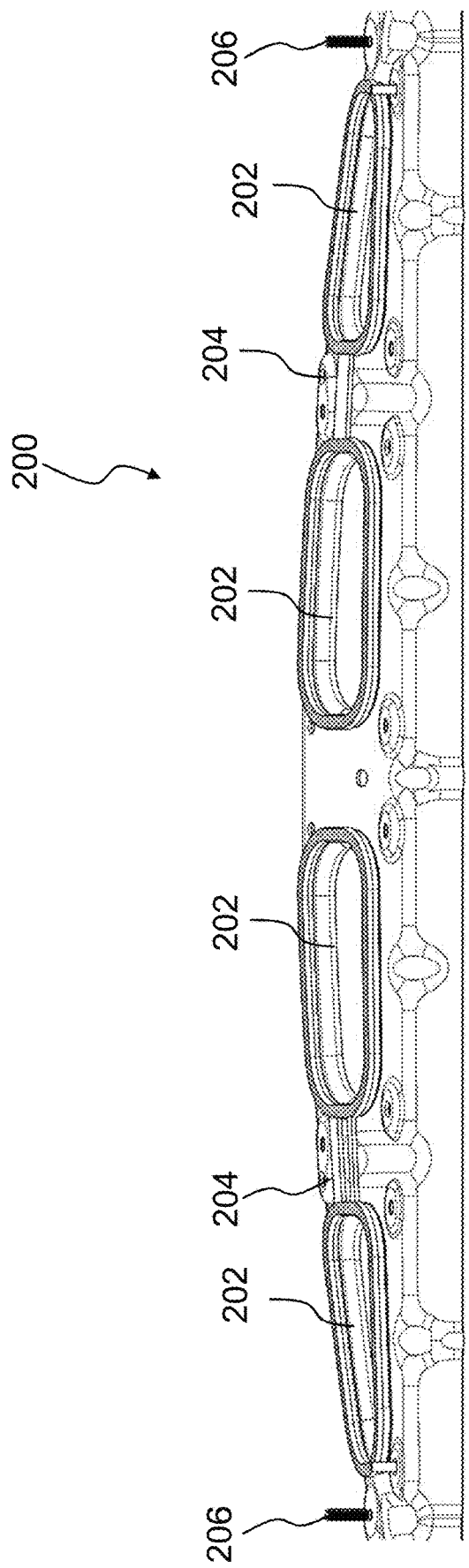
FIG. 5 shows the arched connecting surface of a vehicle in isometric view.

In FIG. 5, the arched connecting surface 200 of a vehicle is illustrated in isometric view. The curvature of the connecting surface 200 can be seen clearly in the isometric view. The openings 202 with their cross-sectional surfaces are not positioned in one plane so that the connecting flanges 16 of channels 14 of a fastening module 10 must be able to bend relative to each other in order to be able to connect the connecting flanges 16 seal-tightly to the various openings 202, respectively. Expediently, the connecting flanges are constructed of a curved configuration and are thus adapted already to the shape of the arched connecting surface 200. By means of the flexible connecting regions 18 of the fastening module 10, a tolerance compensation can be realized in a simple way.

At the arched connecting surface 200, fastening points 204 are arranged for screw-connecting the fastening module 10 to the connecting surface 200. At both sides of the illustrated four openings 202, centering pins 206 for centering the fastening module 10 when mounting on the arched connecting surface 200 are present which interact with the centering receptacles 24 of the fastening module 10.

Figure 6:
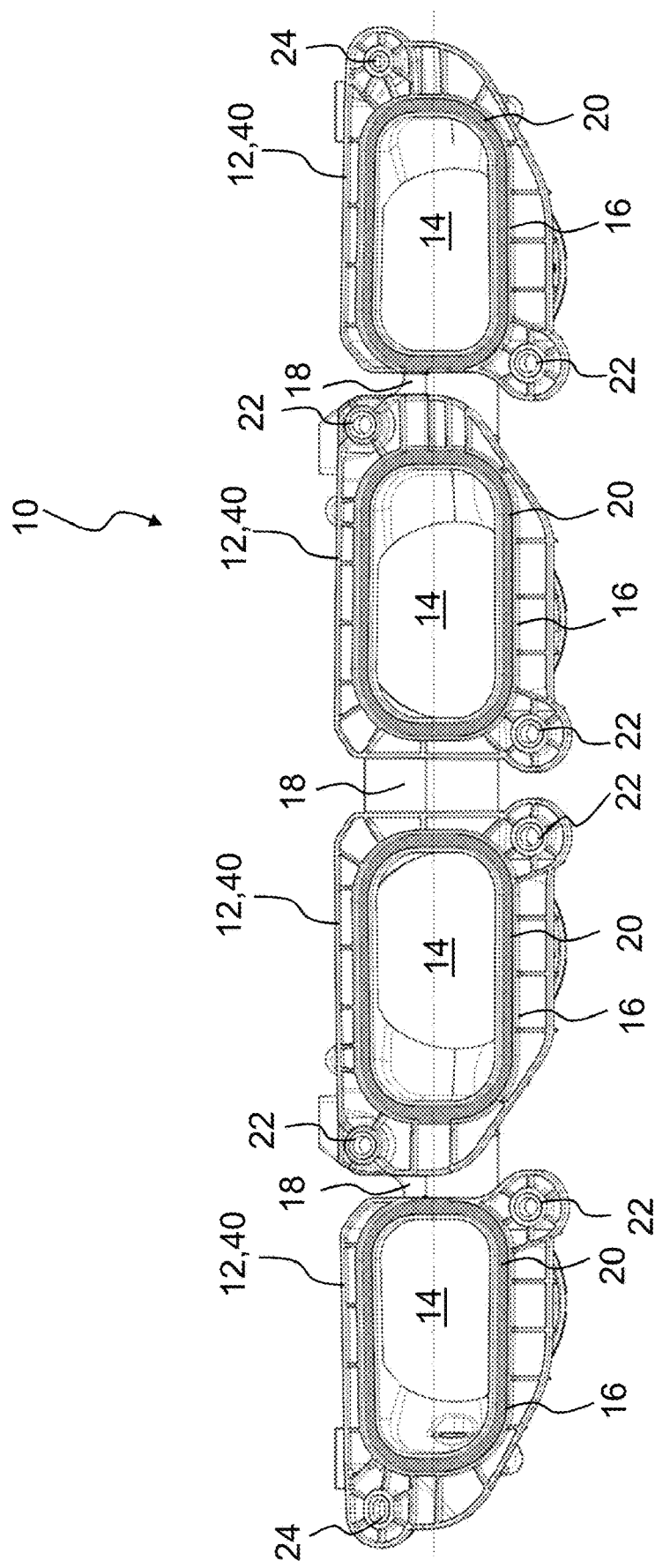
FIG. 6 shows the fastening module of FIG. 1 in a plan view from the side of the connecting flanges.

In FIG. 6, the fastening module 10 of FIG. 1 is illustrated in a plan view from the side of the connecting flanges 16. The channels 14 open at the connecting flanges 16 which are surrounded circumferentially by the sealing segments 20 arranged in the sealing grooves 26. The connecting regions 18 between the individual rigid individual channel pieces 40 are embodied partially differently. However, the connecting regions 18 are all bendable and/or twistable so that the connecting flanges 16 can be connected, matched to the openings 202 of the arched connecting surface 200. The fastening sleeves 22 can be seen adjacent to the connecting flanges 16.

The sealing segment 20 can be embodied as a round cord seal which is inserted into a sealing groove 26 circumferentially extending about the connecting flange 16. The sealing segment 20 can be embodied, for example, as an axial lip seal.

Alternatively, a plurality of connecting flanges 16 can also have a common circumferentially extending seal 30 (FIG. 3). The seal 30 (FIG. 3) can be combined optionally of two or a plurality of circumferentially closed sealing segments 20 that are connected to each other.

Figure 7:
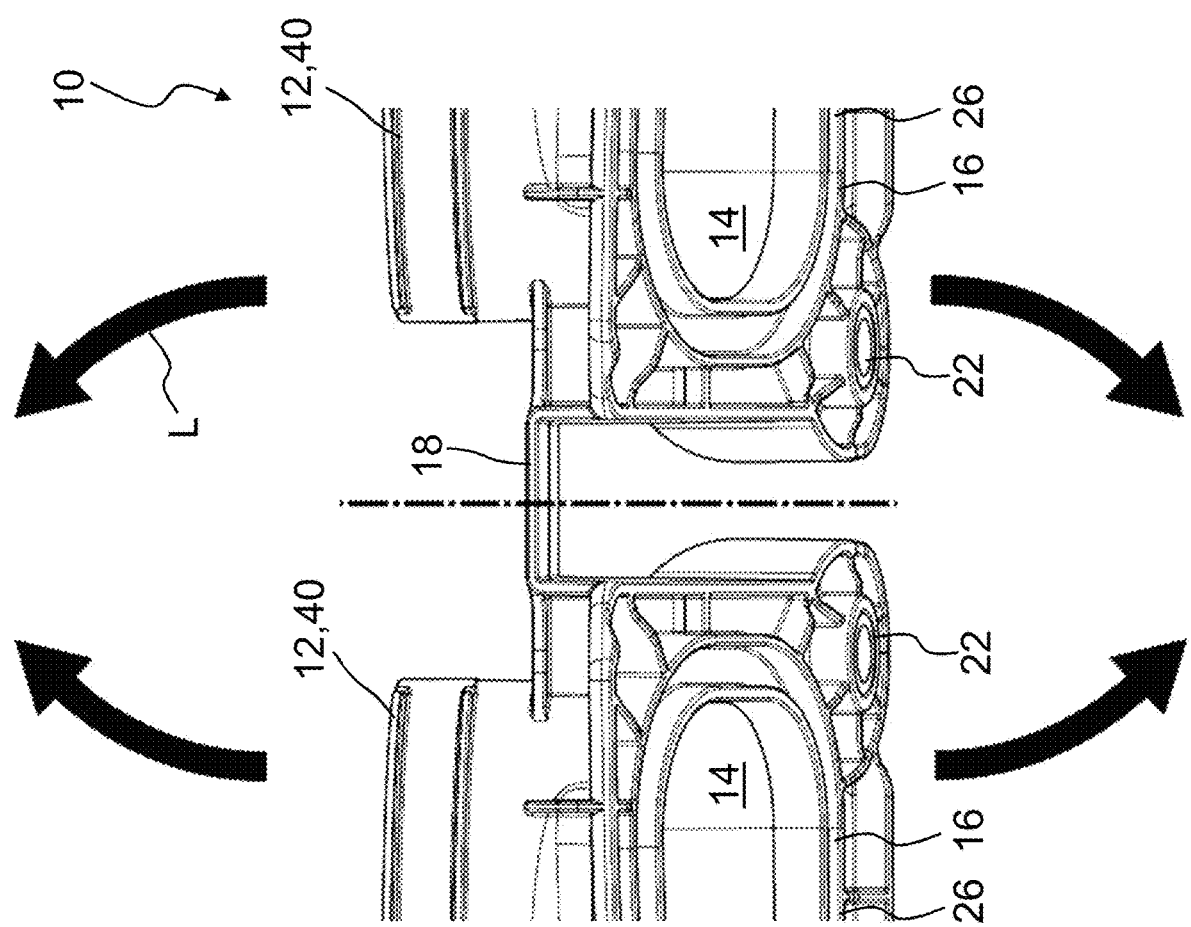
FIG. 7 shows an enlarged detail of FIG. 4 with focus on a connecting region between two channels.

In FIG. 7, an enlarged detail of the fastening module 10 of FIG. 4 with focus on a connecting region 18 between two connecting flanges 16 can be seen. The connecting region 18 is embodied as a web which can be bent in the bending directions L so that the channels 14 with their connecting flanges 16 can be tilted in these bending directions L. In this way, an adaptation to tilted openings 202 of the arched connecting surface 200 can be realized and the connecting flanges 16 can be seal-tightly connected to the openings 202. In the region of the connecting regions 18, the material thickness of the connecting housing 12 can be reduced. In this way, the web 18 can be bent more easily. Alternatively, the connecting region 18 can also be embodied as a hinge, in particular as a film hinge, whereby a bending capability of the connecting region 18 can be achieved also. In this way, handling and manufacture of the fastening module 10 are simplified.

FIGS. 8 to 11 show the housing parts 120, 140 of the filter module 122 according to FIG. 1.

Figure 8:
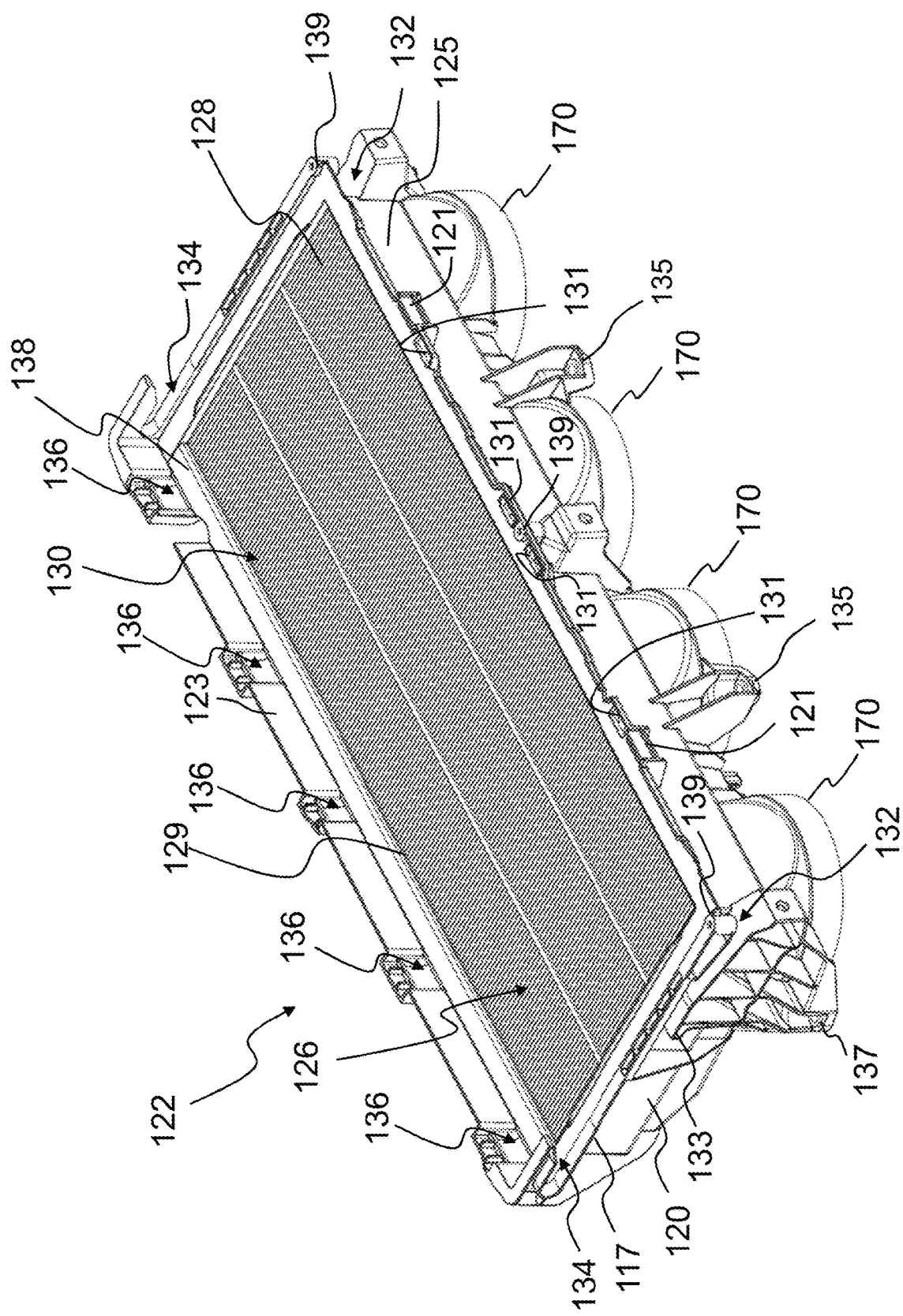
FIG. 8 shows a view of a part of a filter module of the filter system according to FIG. 1 with filter element inserted in the housing part, viewing its inflow side.
Figure 9:
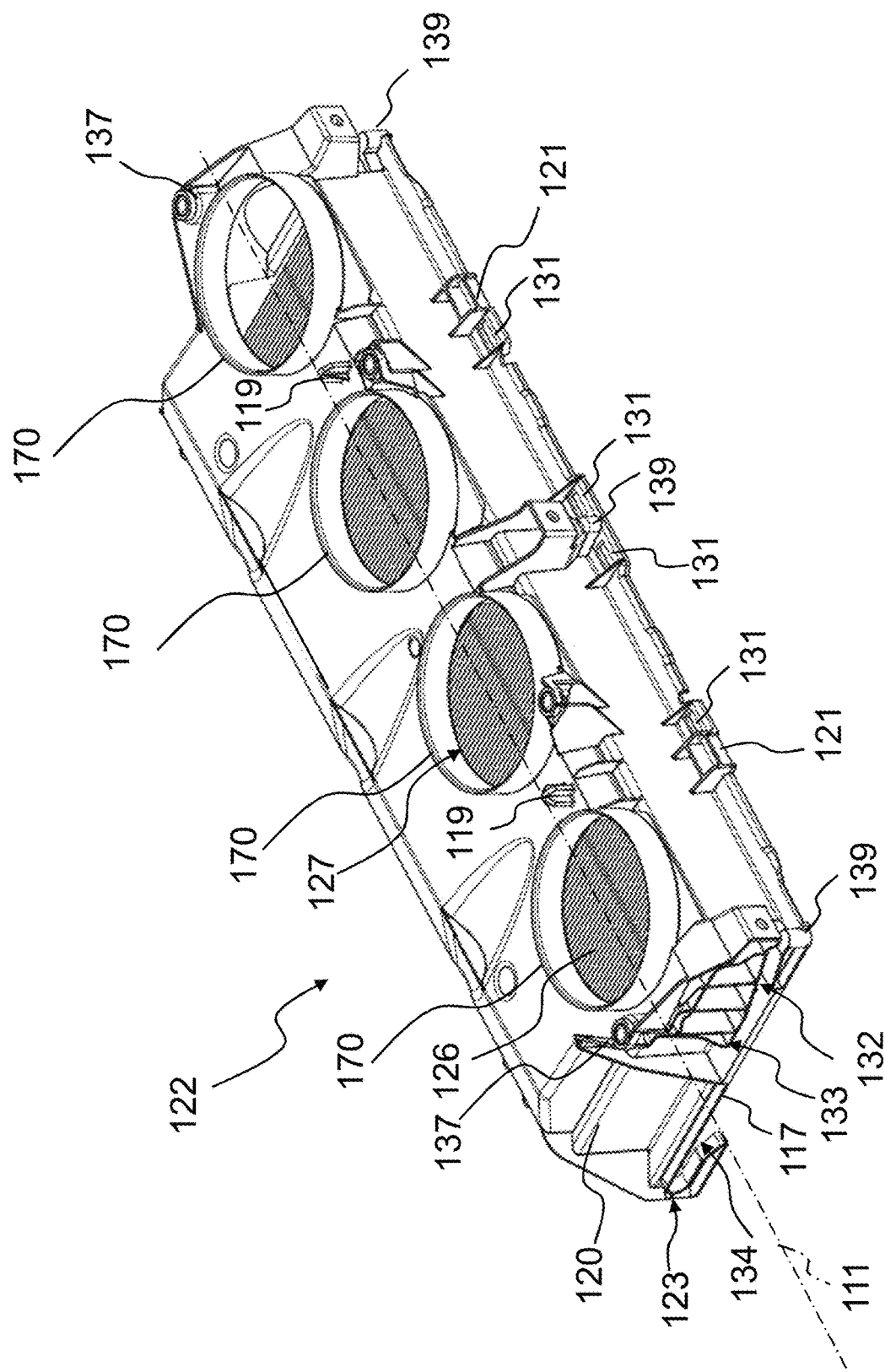
FIG. 9 shows the filter module according to FIG. 8 viewed from its outflow side.
Figure 10:
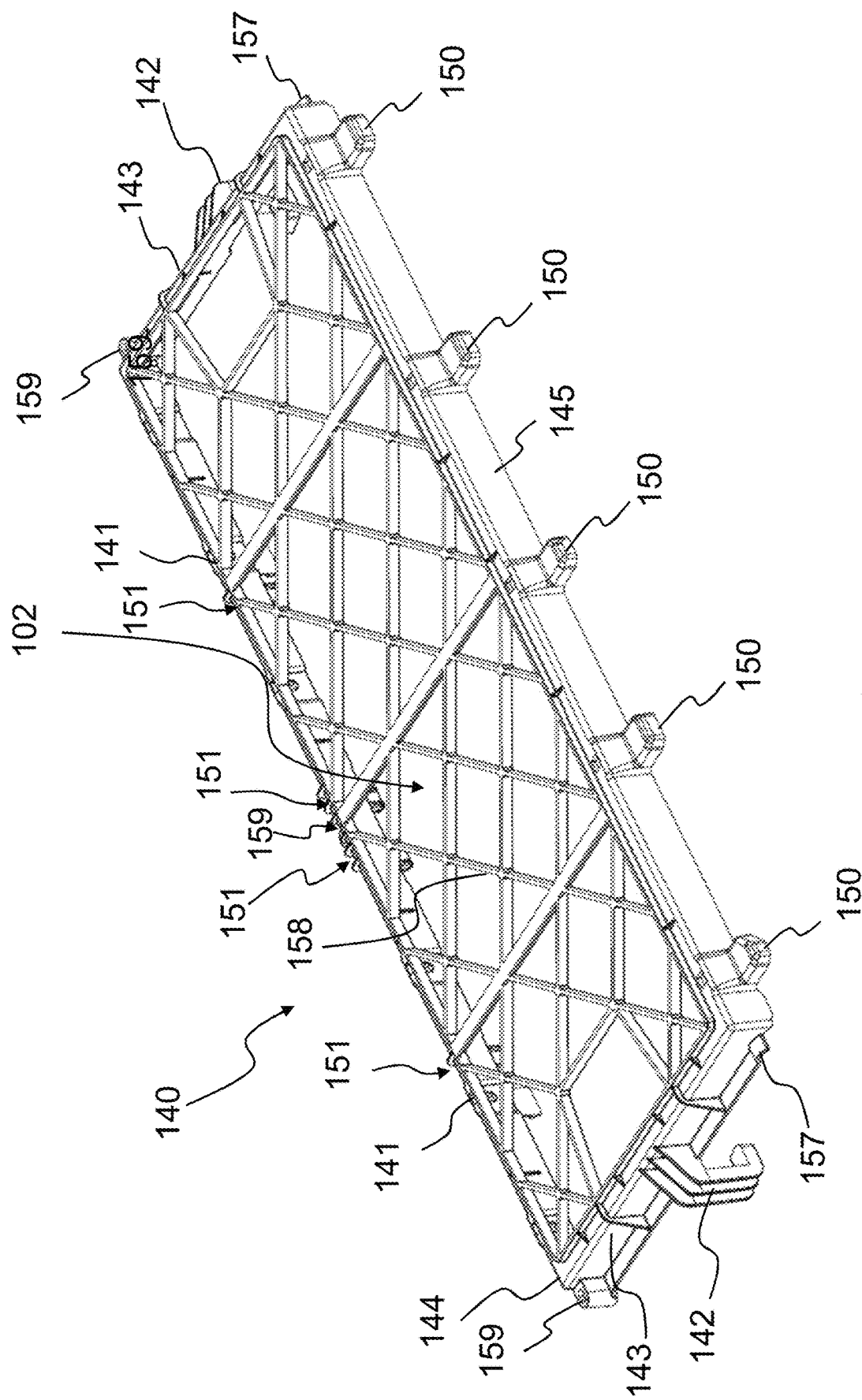
FIG. 10 is a perspective view of a second housing part for a second filter element of the filter module of the filter system according to FIG. 1.
Figure 11:
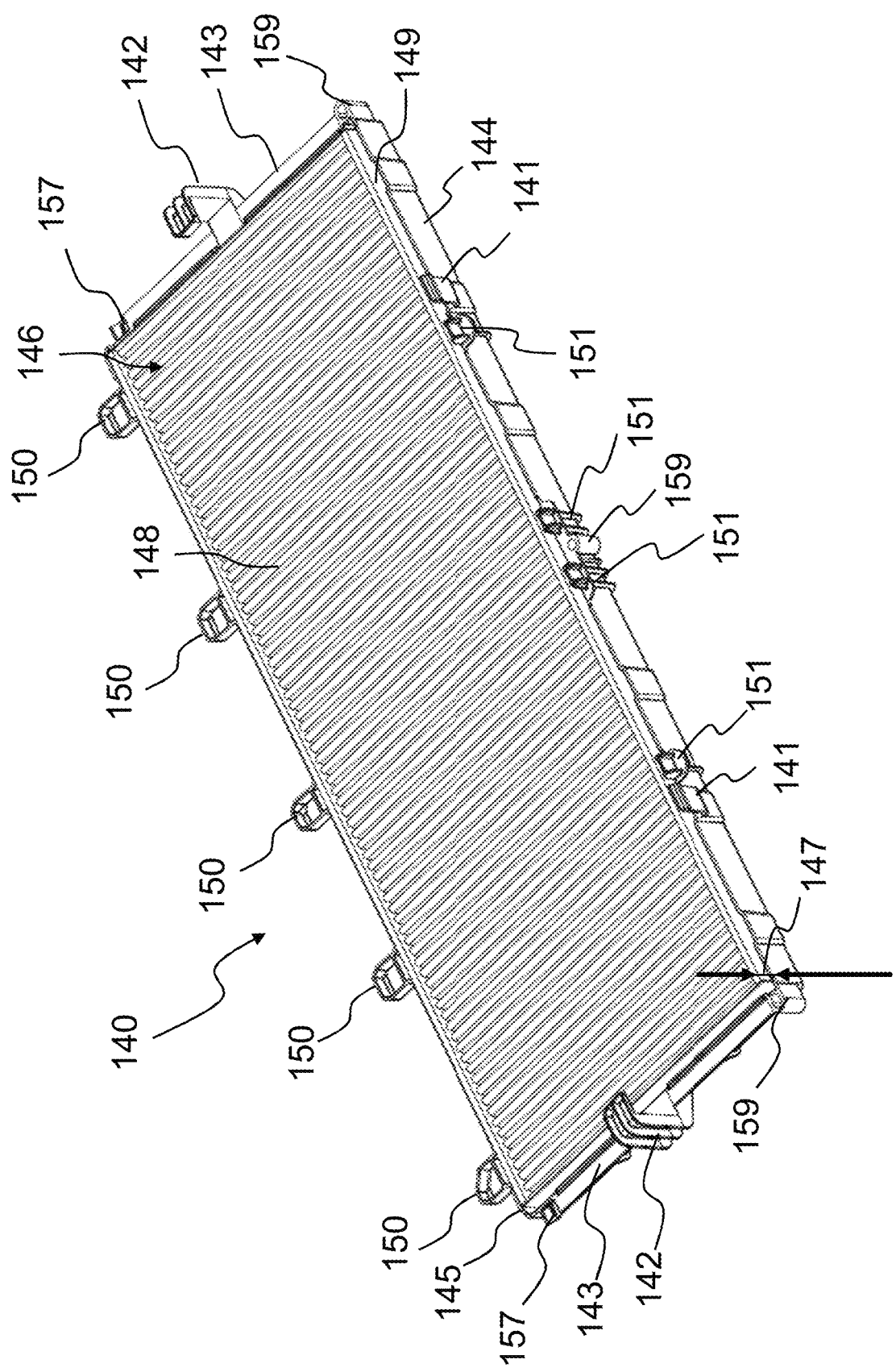
FIG. 11 is a perspective view of the second housing part according to FIG. 10 with inserted filter element.

FIG. 8 shows in this context a view of the first housing part 120 of the housing 110 of the filter module 122 according to FIG. 1 with inserted filter element 126 with a view of its inflow side. In the filter module 122 according to the embodiment in FIG. 1, the inflow side is covered by the second filter element 146 in the second housing part 140. FIG. 9 shows a perspective view of the part of the filter module 122 of FIG. 8 viewed from its outflow side. Optionally, depending on the field of use of the filter module 122, a second filter element 146 can be omitted. FIG. 10 shows a perspective view of a second housing part 140 without filter element from the exterior side while FIG. 11 shows the second housing part 140 with filter element 146 in a view of its outflow side.

The filter element 126 is embodied preferably as a suspended particle filter element, in particular as an EPA or HEPA filter element.

The housing part 120 is preferably of a tub-shaped configuration and comprises in this embodiment a rectangular receptacle 130 for the filter element 126 that can comprise, for example, a simple rectangular filter bellows 128. Due to the tub-shaped structure of the housing part 120, an air collecting chamber 127 is formed at the clean side of the filter element 126 in the housing part 120.

The receptacle 130 is surrounded by two oppositely positioned long sides 123, 125 and two oppositely positioned narrow sides 117 which connect the long sides 123, 125.

One side 123 of the receptacle 130 of the first housing part 120, preferably a longitudinal side, comprises a side wall that projects axially past the sealing surface 138. The rim of the oppositely positioned side 127 of the housing part 120 is flush with the sealing surface 138. The filter element 126 inserted into the receptacle 130 closes off the housing part 120 toward the inflow side and separates the inflow side from the air collecting chamber 127.

The filter bellows 128 is sealed by a circumferentially extending strip 129. The circumferentially extending strip 129, as illustrated in FIG. 1, protrudes toward the clean side of the filter element 126 and is glued into a circumferentially extending groove 124 (FIG. 1) of the housing part 120 which is not visible in FIG. 1. In this way, the filter element 126 is beneficially sealed circumferentially relative to the cleanside air collecting chamber 127.

The receptacle 130 for the filter element 126 is surrounded moreover by a sealing surface 138 circumferentially extending along the sides 123, 117, 125, 117. The circumferentially extending sealing surface 138 is embodied at sealing flange regions which are projecting inwardly into the housing part 120. This enables a seal-tight connection of the further housing part 140 with the second filter element 146 (FIG. 11).

The embodiment of the filter module 122 is preferably such that it enables, essentially by free intake at least across its cross section in the housing part 120 or across the cross section of the filter element 126 arranged therein, an intake manifold-type distribution of the volume flow passing through the filter bellows 128 of the filter element 126 in accordance with the intake openings of the connecting flanges 16 (FIGS. 1 through 4) of the fastening module 10 that are defined by the individual channel pieces 40 (FIGS. 1, 3). At the outflow side, the housing part 120 comprises at least two, preferably at least three, outlet channels 170 for the fluid in an intake manifold-type arrangement. In this embodiment, the outlet channels 170 are lying in one plane and are aligned with each other along an axis 111.

In the side wall of the side 123, five concave receptacles 136 are arranged in which tongue-type projections 150 (FIGS. 10, 11) are insertable in horizontal direction. Receptacles 136 and projections 150 form a hinge-type connection.

Moreover, guides 134 are arranged at both ends of the side 123 and project at a right angle from the side wall 123 and extend parallel to the narrow sides 117. The guides 134 extend adjacent to and above the sealing surface 138 of the first housing part 120.

At the oppositely positioned long side 125 of the housing part 120, optionally three fastening sleeves 139, in particular screw sleeves, are arranged to which the second housing part 140 can be secured by means of screws. In this way, a distortion of the two housing parts 120, 140 can be compensated.

Moreover, at the oppositely positioned long side 125 of the housing part 120, two locking elements 121, for example, locking noses, are provided at which corresponding locking counter elements 141, for example, locking hooks, of the second housing part 140 can be locked in axial direction.

Moreover, four centering elements 131 are formed between the two locking elements 121, wherein the two middle ones are arranged adjacent to the two sides of the middle one of the fastening sleeves 139. The centering elements 131 are embodied, for example, as eyes in order to receive corresponding centering counter elements 151 of the second housing part 140 which are, for example, embodied as pins.

The second housing part 140 is disclosed in more detail in FIGS. 10 and 11. At the inlet region 102, the housing part 140 comprises a grid 158 so that fluid, for example, air, can enter substantially unhindered the housing part 140 and the filter element 146 arranged therein. The filter element 146 can be placed loosely into a receptacle of the second housing part 140 and can be fixed therein for mounting by a light compression.

The filter bellows 148 of the second filter element 146 is sealed at its edges with a strip 149 wherein at least at the long sides preferably a strongly compressible, for example, foam-type, strip 149 is provided that in axial direction can be strongly compressed while at the narrow sides the same or a strip that is less compressible can be provided. The strip 149 comprises at least at the long sides a protrusion 147 that may amount to, for example, several millimeters. The protrusion 147 can be of the same magnitude at the long sides and the narrow sides.

On a long side 145 of the housing part 140, tongue-type projections 150 are arranged which correspond with the receptacles 136 in the first housing part 120.

At the oppositely positioned long side 144, the locking counter elements 141, for example, locking hooks, corresponding with the locking elements 121 of the first housing part 120 as well as centering counter elements 151, for example, pins, corresponding with the centering elements 131 of the first housing part 120 as well as fastening sleeves 159 corresponding with the fastening sleeves 139 of the first housing part 120 are arranged.

At the narrow sides 143 of the second housing part 140, a respective guide element 142 is arranged that, for example, is embodied with a long leg and a short leg in a substantially L-shaped form. The short legs point toward the housing part 140. The long legs of the guide are arranged outward of a rim segment 157 of the narrow side 143.

The interaction of the housing parts 120, 140 upon assembly will be explained in the following when looking at FIGS. 8 to 11 together.

At the two narrow sides 117 of the first housing part 120, which connect the protruding side wall of the side 123 and the side 125 oppositely positioned thereto, guides 132, 134 are provided which serve for pushing the second housing part 140 onto the first housing part 120. The second housing part 140 is pushed laterally onto the first housing part 120, wherein the second housing part 140 is substantially pushed in horizontally to the sealing surface 138 of the first housing part 120.

The guide element 142 on both narrow sides 143 of the second housing part 140 in mounting direction engages with its short leg a guide surface of the first guide 132 when the second housing part 140 is pushed laterally onto the first housing part 120. The first guide 132 extends adjacent to and below the sealing surface 138 and is curved convexly toward the sealing surface 138.

The long leg of the respective guiding element 142 has a length that ensures that upon pushing on the second housing part 140 a sufficient free space of the second filter element 146 remains above the sealing surface 138 and the first filter element 126. Despite the protrusion 147, the strip 149 and the filter elements 126, 146 are thus sufficiently protected from damage during the pushing-on action.

On each of the narrow sides 143 of the second housing part 140, the leading rim segment 157 of the second housing part 140 engages the second guiding surface 134 shortly before the end position.

The guiding surface of the first guide 132 ends at an end 133 with which the respective guiding element 142 of the second housing part 140 can move downward, away from the sealing surface 138.

In this state, the rim segments 157 of the first housing part 140 are inserted into the second guide 134 of the first housing part 120 and axially held. Furthermore, the projections 150 at the leading side 145 of the second housing part 140 have dipped into the concave receptacles 136 in the protruding side wall of the first housing part 120 and are axially fixed.

The projections 150 and receptacles 136 form a hinge-type connection so that the second housing part 140 at its side 144 which is opposite the hinge-type connection can be pushed in the direction of the first housing part 120 whereby the centering elements 131 at the side 125 of the first housing part 120 and the centering counter elements 151 at the side 144 of the second housing part 140 engage each other until the locking elements 121 lock with the locking counter elements 141. In doing so, the strip 149 of the second filter element 146 is axially pressed such that a good sealing action between the second filter element 146 and the sealing surface 138 of the first housing part 120 is achieved. Subsequently, the second housing part 140 can be screw-connected to the first housing part 120 by means of the respective fastening sleeves 139, 159.

In the operational state, the housing part 120 is arranged with its outlet channels 170 above the respective individual channel pieces 40 with the connecting flanges 16. By means of the laterally arranged fastening sleeves 137 as well as the fastening sleeves 135 arranged at the side 125 that is positioned opposite the axially protruding side wall 123, the filter module 122 can be fastened by means of the first housing part 120 at the connecting surface 200 (FIGS. 1, 3).

What is claimed is:

1. A fastening module configured to connect a filter system to an arched connecting surface with openings for passage of a fluid, the fastening module comprising:
  a connecting housing configured to be connected in fluid communication to the filter system;
  rigid individual channel pieces arranged in the connecting housing, wherein channels extend in the rigid individual channel pieces and the channels are configured to correspond with the openings in the arched connecting surface;
  wherein the rigid individual channel pieces comprise connecting flanges configured to be connected to the openings in the arched connecting surface;
  wherein the rigid individual channel pieces are connected by flexible connecting regions with each other; with the connecting housing; or with each other and with the connecting housing.

2. The fastening module according to claim 1, further comprising an axial sealing action relative to the arched connecting surface; a radial sealing action relative to a filter housing of the filter system; or an axial sealing action relative to the arched connecting surface and a radial sealing action relative to a filter housing of the filter system.

3. The fastening module according to claim 1, wherein the connecting regions are bendable and/or twistable in directions inclined relative to each other.

4. The fastening module according to claim 1, wherein the connecting regions are bendable and/or twistable in two directions that are perpendicular relative to each other.

5. The fastening module according to claim 1, further comprising circumferentially extending sealing segments arranged at the connecting flanges.

6. The fastening module according to claim 5, wherein the sealing segments are axial lip seals.

7. The fastening module according to claim 5, wherein at least two of the sealing segments are of a circumferentially closed configuration and combined to a common circumferentially extending seal arranged at at least two of the connecting flanges.

8. The fastening module according to claim 7, wherein the at least two sealing segments are connected to each other with a connecting piece.

9. The fastening module according to claim 1, wherein the flexible connecting regions are hinges.

10. The fastening module according to claim 1, wherein at least one of the connecting housing, the individual rigid channel pieces, and the connecting regions is comprised of plastic material.

11. The fastening module according to claim 10, wherein at least one of the connecting housing, the individual rigid channel pieces, and the connecting regions is an injection molded part.

12. A filter system comprising:
a filter housing;
at least one filter element arranged in the filter housing and separating a raw side of the filter system from a clean side of the filter system;
an inlet region for a fluid to be filtered and an outlet region for a filtered fluid;
a fastening module configured to connect the filter system to an arched connecting surface with openings for passage of a fluid, the fastening module comprising:
a connecting housing;
rigid individual channel pieces arranged in the connecting housing, wherein channels extend in the rigid individual channel pieces and the channels are configured to correspond with the openings in the arched connecting surface;
wherein the rigid individual channel pieces comprise connecting flanges configured to be connected to the openings in the arched connecting surface;
wherein the rigid individual channel pieces are connected by flexible connecting regions with each other; with the connecting housing; or with each other and with the connecting housing;
wherein the fastening module is connected in fluid communication to the inlet region or to the outlet region.

13. The filter system according to claim 12, wherein the fastening module is arranged at the clean side of the filter system.

14. The filter system according to claim 12, wherein the fastening module comprises an axial sealing action relative to the arched connecting surface; a radial sealing action relative to the filter housing; or an axial sealing action relative to the arched connecting surface and a radial sealing action relative to the filter housing.

15. The filter system according to claim 12, further comprising at least one filter module, wherein the filter housing comprises one or more housing parts, wherein the filter module includes at least one of the housing parts of the filter housing and comprises one or more filter elements arranged in the at least one housing part, wherein the at least one housing part comprises at least two outlet channels connected in fluid communication to the channels extending in the rigid individual channel pieces of the fastening module, wherein the at least one filter module is provided with substantially free intake across a cross section of the at least one filter module, wherein the at least one filter module, via the at least two outlet channels of the at least one housing part, enables an intake manifold-type distribution of a volume flow passing through the one or more filter elements.

16. The filter system according to claim 15, wherein the one or more filter elements include a first filter element and a second filter element, wherein the first filter element is arranged downstream of the second filter element in a flow direction of the fluid to be filtered.

17. The filter system according to claim 16, wherein the one or more housing parts of the filter housing include a first housing part and a second housing part, wherein the first filter element is arranged in the first housing part and the second filter element is arranged in the second housing part.

18. The filter system according to claim 17, wherein the first housing part and the second housing part are detachably connected to each other.

19. A filter module for a filter system according to claim 12, the filter module comprising:
a first housing part;
a filter element arranged in the first housing part;
wherein the filter module comprises substantially free intake across a cross section of the filter module and enables an intake manifold-type distribution of a volume flow passing through the filter element.

20. The filter module according to claim 19, wherein the first housing part comprises at least two outlet channels configured to provide the intake manifold-type distribution of the volume flow.

21. The filter module according to claim 19, wherein the first housing part is tub-shaped so that at an outflow side of the filter element a clean-side air collecting chamber is formed.

22. The filter module according to claim 21, wherein the first housing part at the outflow side of the filter element comprises two or more outlets channels connected in fluid communication to the clean-side air collecting chamber.

23. The filter module according to claim 22, wherein the two or more outlet channels are arranged linearly adjacent to each other along an axis.

24. The filter module according to claim 21, wherein the filter element is circumferentially sealed in the first housing part relative to the clean-side air collecting chamber.

25. The filter module according to claim 19, wherein the first housing part comprises an inwardly projecting sealing flange region comprising a sealing surface configured to be seal-tightly connected to a second housing part provided with a further filter element.

26. The filter module according to claim 19, wherein the filter element is a suspended particle filter element.

27. The filter module according to claim 19, further comprising a second housing part and a further filter element arranged in the second housing part, wherein the second housing part adjoins the first housing part.

28. The filter module according to claim 27, wherein the first and second housing parts comprise one or a plurality of corresponding guides and/or guide elements for fastening the second housing part.

29. The filter module according to claim 19, wherein a hinge connection is formed between the first and second housing parts.

\* \* \* \* \*